E. FORLANINI.
HYDROAEROPLANE.
APPLICATION FILED JULY 26, 1907.
1,024,067.
Patented Apr. 23, 1912.
4 SHEETS—SHEET 1.
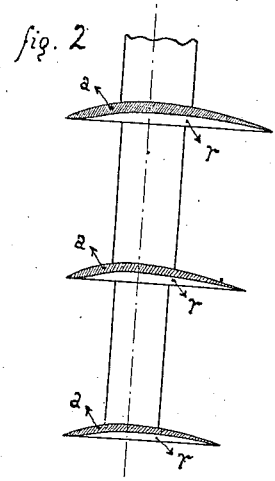
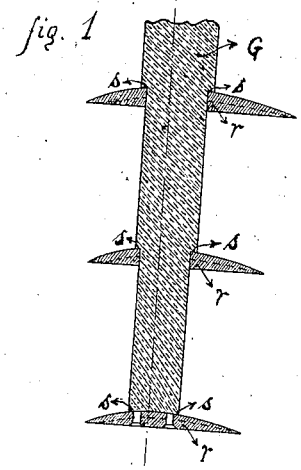
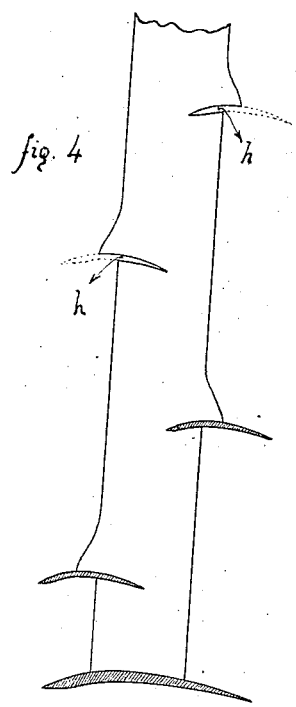
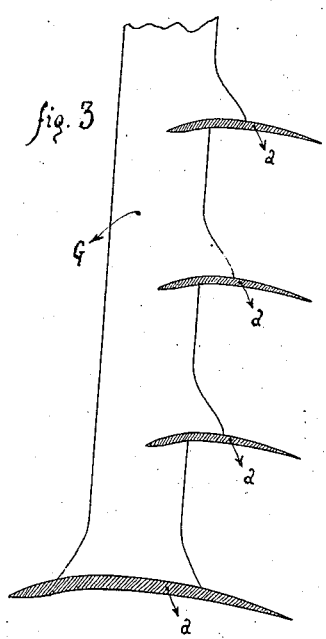
Witnesses:
N. Reynolds
M. B. Taylor
Inventor:
Enrico Forlanini
by Giorgii & Massid
Attorneys

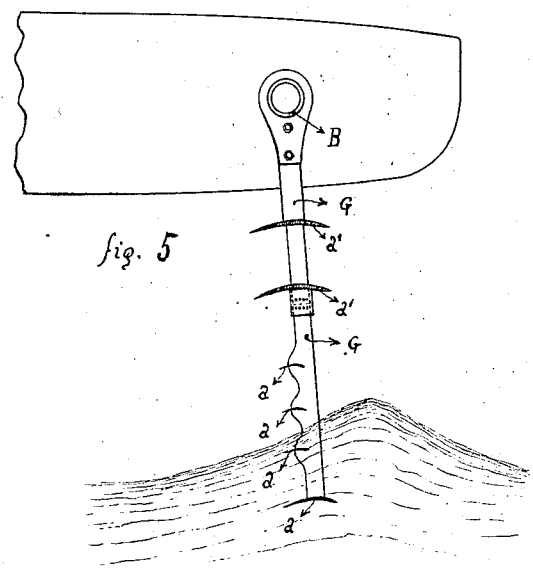
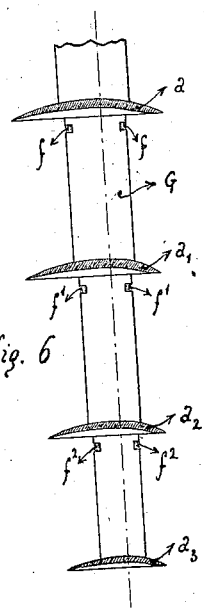
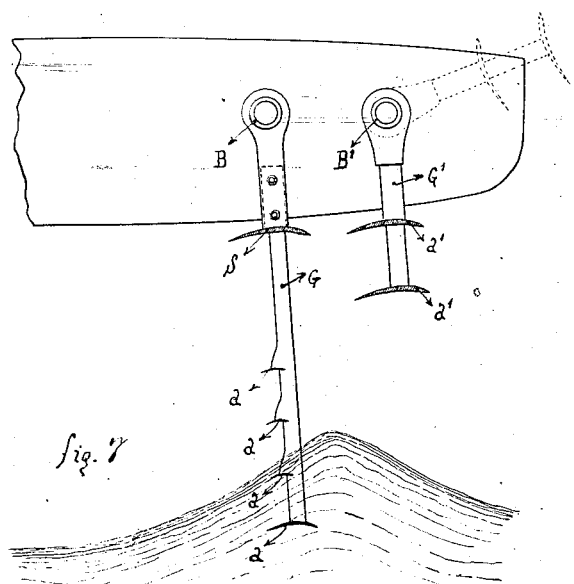

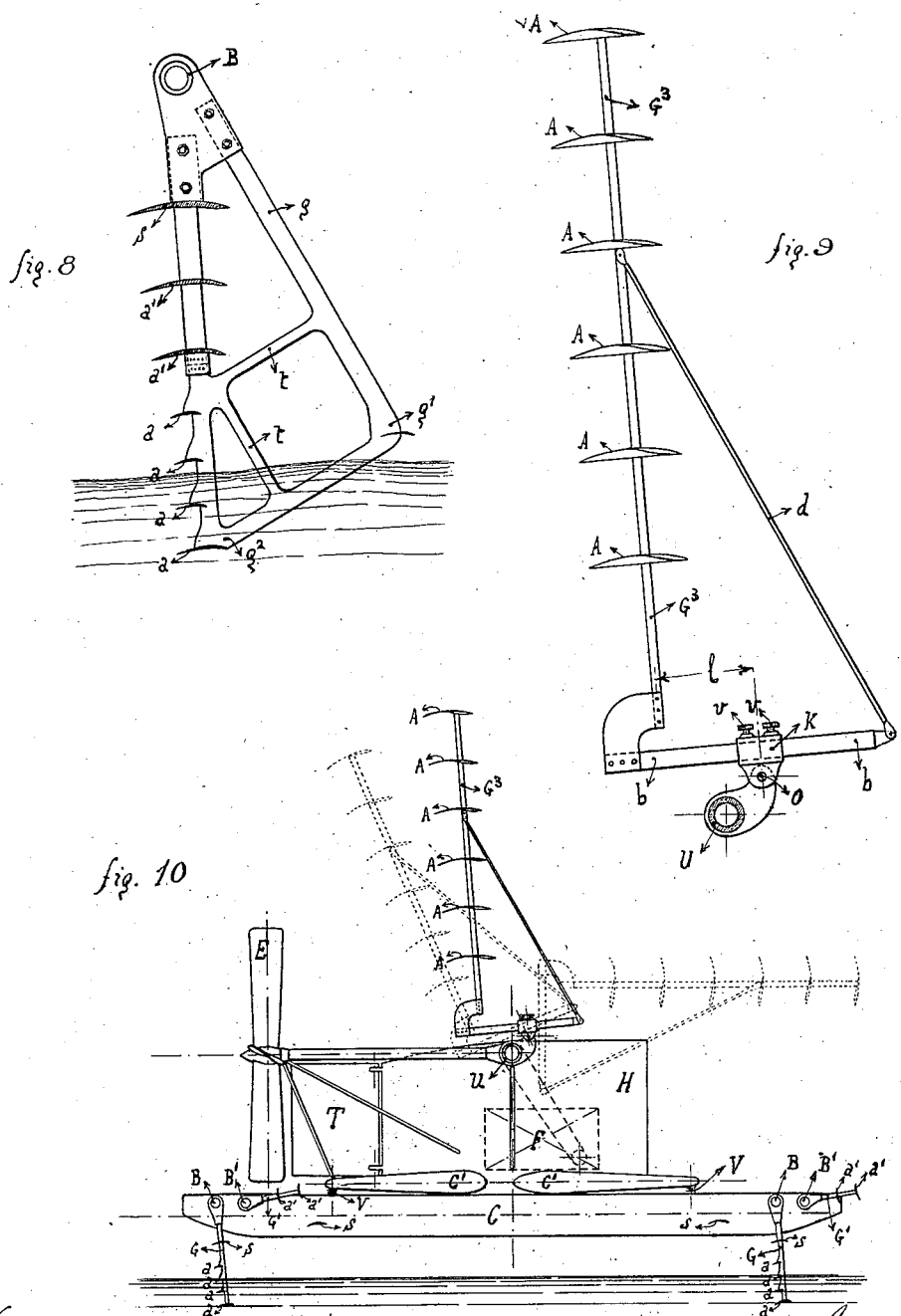

UNITED STATES PATENT OFFICE.

ENRICO FORLANINI, OF MILAN, ITALY.

HYDROAEROPLANE.

1,024,067. Specification of Letters Patent. Patented Apr. 23, 1912.

Application filed July 26, 1907. Serial No. 385,675.

*To all whom it may concern:*

Be it known that I, ENRICO FORLANINI, mechanical engineer, a subject of the King of Italy, residing at No. 21 Via Boccaccio, Milan, Italy, have invented new and useful Improvements in Hydroaeroplanes, of which the following is a specification.

The present invention refers to improvements in the apparatus covered by the application filed April 6th 1905 Serial No. 254,174. Said former application concerns an apparatus which I called a "hydroflying machine" capable of traveling in three distinct ways, namely:

1. In the water, similarly to ordinary vessels.

2. Just raised, that is to say at a slight distance above the surface of the water. In this case the apparatus is supported in the air by the dynamic reaction created during the motion of the apparatus, by air and water on plates or blades immersed respectively in the two fluids, and suitably connected to the body of the apparatus.

3. Totally raised in the air, being supported by the dynamic reaction, during the motion of the apparatus, on aerial blades.

The supporting water-blades are at all times indispensable, because even an apparatus intended to travel in the air itself, must start from the water, when the water-blades will allow the apparatus to reach such a speed that the air-blades can support the whole of the weight without being too large.

The air-blades, while they are not necessary if the apparatus is intended to travel at all times in contact with the water, may however be of great use even in this case, chiefly when the apparatus has to travel on rough water, because the air blades can give the apparatus an additional support free from the influence of the waves, thus lessening the influence of the waves upon the apparatus.

Figure 11:
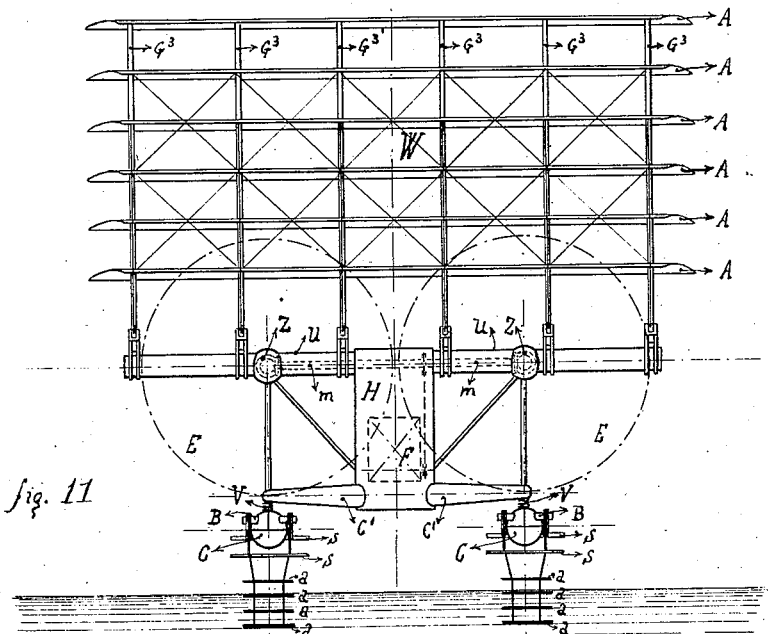
Figure 12:
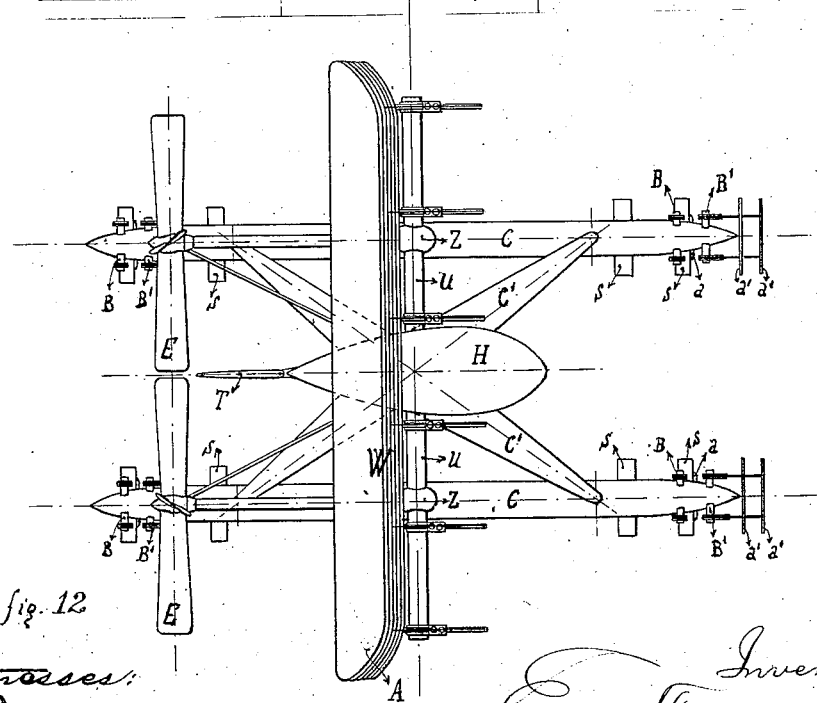

In the accompanying drawings: Figures 1 to 4 show several ways of fixing blades to rods; Fig. 5 shows a rod with starting blades; Fig. 6 shows a rod with notches to provide a series of weak points; Fig. 7 shows a rod carrying a safety blade and a separate beam carrying the starting blades; Fig. 8 shows a fender or special frame to protect a group of blades against blows or shocks. Fig. 9 is an end view of an aerial grate showing the peculiar manner of connecting the same to the body of the apparatus. Fig. 10 is a side elevation of the complete machine; Fig. 11 is a front elevation of the machine; and Fig. 12 is a plan view thereof.

The water-blades $a$ (Figs. 1, 2, 3, 4, &c.,) are connected to the body of the apparatus through rods G, which transmit the upward pressure. In order to insure the transmission of the upward thrust from the blades to the rods, the rods should have a conical formation or be provided with shoulders, $s$, at the points where they intersect the blades, as shown in Fig. 1. Where the rod passes through a blade, the latter will be weakened, ordinarily, so that it is advisable to reinforce the blades by ribs or enlargements, $r$, as shown in Figs. 1 and 2. Small blades would be too greatly weakened by passing the rod through them. To attain the necessary strength of structure in this instance, I embed the edges of the blades in notches or recesses, $h$, in the side of the rod, the rod being provided with off-sets or enlargements, $h'$, to reinforce and brace the blades.

In my former application I have stated that the superposed blades allow the apparatus to travel in rough water, also that for this purpose it is advisable to adopt superposed blades of different surface area, so that the greatest part of the supporting surface should always be immersed, the remainder of this surface being subdivided into small blades taking up the whole of the wave stratum. Such an arrangement is illustrated in Fig. 5, in which figure are shown two upper larger blades, $a'$, $a'$, on the rod G, which I call starting blades and are intended to raise the body of the apparatus from the water at slow speed and to lie fully above the wave stratum at high speed. The starting blades may advantageously be secured to rods G' mounted on separate beams B' adapted to rotate, as shown in Fig. 7, so that the starting blades can be removed from the water without withdrawing the remaining blades therefrom.

Serious trouble may arise in the use of the apparatus if the hydraulic blades meet in their movement with stray bodies floating or partially submerged in the water. Objects of small size might easily pass between the openings of the structure formed by the rods and the blades, or slight objects, such as weeds and the like, may accumulate on the front edges of the rods and blades, increasing the effort required for the movement of the apparatus. It may then become necessary to clean rods and blades, which could be done in several ways, for instance by stopping the apparatus and then reversing for a moment its motion. But large or heavy bodies or obstacles such as branches of trees, beams or the like, would produce against the grate of rods and blades moving at great speed a sudden and formidable shock capable of breaking or bending rods G and exposing the apparatus to great danger. This trouble would be less serious if the apparatus were partially supported by aerial blades, which consequently form a peculiar and almost indispensable feature of a hydroaeroplane. On the other hand, should such a trouble arise, it would be preferable for rods G to break like glass rather than to bend, for, by bending around in a contrary direction to their original inclination, they would tend to draw the apparatus under water. It is, therefore, advisable to construct rods G of very hard steel, of little flexibility, i. e. tool steel. In order to obviate this danger it is also advisable to provide in rods G a series of weak points, the said weak points being close under each blade. Fig. 6 shows the lower portion of a rod G fitted with four blades $a$, $a'$, $a^2$, $a^3$; close under each of the three upper blades are two dents or notches $f\,f$, $f'\,f'$, $f^2\,f^2$ (see Fig. 6) filled with tin, and being of a depth so calculated that a horizontal strain bearing on blade $a^3$ would break the rod at $f^2\,f^2$ rather than at $f'\,f'$, and that if the strain were brought to bear between the blades $a^2$ and $a'$, the rod would break at $f'\,f'$ rather than at $f\,f$, and so on. As shown in Figs. 7 and 8, the groups of rods and blades may be further provided with an upper safety blade S which is ordinarily out of the water even when the machine is at rest, but which may rest upon the water in the event of a rod being broken.

The above-mentioned troubles are better met with by the arrangement shown in Fig. 8. Each rod G is provided with a protecting frame $g$, $g'$, $g^2$ bent at $g'$. The different protecting pieces are connected to each other at $g'$ by a narrow blade which increases the strength of the structure. The protecting part of the frame is from $g'$ to $g^2$ and must be carried up to such a height as to protect the lower blades, or such blades only which are still immersed when the speed of the apparatus becomes dangerous. The section and the way of construction of frames $g\,g'$ $g^2$ is the same as for rods G. Portion $g'\,g^2$ must be sufficiently strong; it can be strengthened if necessary by stays $t\,t$. Heavy obstacles floating in the water when meeting with the inclined parts $g'\,g^2$ slide beneath the same under the lowest blades, and fracture of rod G is avoided.

Naturally the greatest danger will result from broken front groups, so that the protecting arrangement of Fig. 8 need only be applied to these groups. This arrangement will be more effective if bearing springs are interposed between the beams carrying the blades and the body of the apparatus. The groups of rods and blades and also of the protecting frames are properly strengthened by means of tie bars. These bars have a lenticular non-symmetrical section similar to the other parts of the apparatus.

In my former application I have stated that it is very useful, in order that gradual experiments in flight may be effected, to add to a hydroplane aerial supporting surfaces. This addition permits the operator to practise without danger the art of maintaining the equilibrium of the apparatus by operating vertical and horizontal rudders and, if necessary, other parts. This object will be more readily attainable if some of the maneuvers are effected automatically. One of the most important and delicate of these maneuvers is to vary the angle that the aerial surfaces make with the horizontal direction of travel in order that the supporting force may be kept constant notwithstanding changes of velocity, or to cause the supporting force to vary, and, particularly, to displace according to requirements the resultant of the air pressure upon the aerial surface.

The problem is rendered very simple by the use of the construction adopted by me and illustrated in Figs. 9 and 10 in which the aerial blades A A are fixed to rods $G^3$ and the entire grate is mounted to oscillate about a point in front of the plane of the grate and fixed to the body of the machine. Such a grate possesses the property of automatically assuming and maintaining a position of equilibrium in respect to the velocity of the impinging air. It is also essential that the position of the center of oscillation be such that it imparts to the blades the desired inclination relative to the horizontal direction of motion. This object is attained by suitably shifting the center of oscillation as, for instance, illustrated in Fig. 9. In this arrangement the lower end of each rod $G^3$ is fixed to an arm $b$ mounted in a sleeve K and adjustably secured therein by set screws $v\,v$, the said sleeve being pivotally mounted at O on the end of a short arm U', projecting from a transverse rod U, on the body of the apparatus.

The position of equilibrium of the grate relative to a given velocity of the impinging air varies according to the distance (indicated by $l$ in Fig. 9) between the pivot and the plane of the grate. A distance may be readily found such that at the normal working speed of the apparatus the inclination of the blades will be such as to give the highest efficiency. By varying the speed above or below the normal, the inclination of the blades relative to the horizontal direction of motion diminishes or increases, but the most advantageous inclination can be readily obtained by varying the distance indicated by $l$ and for this purpose the arm $b$ is adjustable through the sleeve K. The inclination of the blades alters with the variation in the velocity of the wind, as stated above, but the vertical reaction may increase or diminish according to the degree of concavity of the blades and there is a form of blade with which this reaction is practically constant over extensive speed limits. I have demonstrated that this constancy is obtained when the rise in the curve of the longitudinal section (taken in the direction of movement) is about 1/18 of the length of the chord. If the rise is 1/20 of the chord the reaction will diminish when the speed increases, while the reaction will increase if the rise be 1/16 of the length of the chord. The relation of the vertical reaction to the speed is also influenced by the distance between the blades and it is possible to construct aerial grates in which the vertical reaction will be constant or will increase or diminish at will.

In the case of a hydroaeroplane it is very important that the lift which the aerial grate exercises on the rest of the apparatus be practically constant, otherwise a sudden squall could raise the apparatus from the surface of the water and it would become a flying machine before the operator (or any automatic device) would have time to regulate its equilibrium. If the lifting effect of the aerial grate remains constant, the portion of weight which connects the apparatus with the horizontal surface of the water and guarantees its equilibrium, remains also constant. When it is desired to lessen this part of weight, it will be sufficient to lessen the distance $l$ (Fig. 9), leaving the other parts as they are; vice-versa the weight supported by the aerial grate can be lessened by increasing this distance. It is clear that flights even at low speed can be thus accomplished with the apparatus, for, when wishing to lessen the support given to it by the water, one can diminish $l$ instead of increasing the speed. The constancy of the supporting effort of the aerial frame is useful also in the case of flying machines, for it allows of the speed being changed without varying the height of the apparatus, and on the other hand it is easy to alter the height by altering the distance $l$. It is, of course, necessary that the motor be sufficiently elastic to allow of the effort being changed as required.

The longitudinal equilibrium being guaranteed by the great stability of my aerial grate, it becomes only necessary, in order to maintain perfectly automatic equilibrium, to provide means for the transversal equilibrium. I will briefly draw attention here to the known principle, $i.\ e.$ that of making the direction of the principal forces acting on the apparatus pass through a single point ($i.\ e.$ through the pivot of the aerial frame) and to the fact that consequently the longitudinal oscillations of the part of the apparatus situated under the aerial grate and supported by the latter, have little influence on the general equilibrium, and can be damped by horizontal rudders. These oscillations also cause so little deviation in the direction of thrust as to be of no practical importance; moreover, if required, the shafts of the propellers can be arranged to oscillate with the aerial frame, as well as the motor. The transverse equilibrium is obtainable through some device accurately indicating the horizon. For this purpose a "gyroscope" may be employed; but it must be used simply as an indicator, and the power necessary for the regulating mechanism must be furnished by the motor through a relay controlled by the "gyroscope."

Figs. 10, 11, 12 illustrate a type of hydroaeroplane apparatus adapted to travel as desired in either of the methods previously referred to, as well as on slightly agitated waters. C C are two cylindrical bodies, the extremities of which are tapered so as to act as stem and stern when the apparatus is floating, and to reduce the air resistance in the other two cases. The sub-division of the hull into two parallel bodies somewhat apart from each other is advisable owing to the fact that the center of gravity of the whole machine being located rather high, the machine must be provided with an extensive supporting basis even when floating. It is evident that other conditions being the same, the stability with two separate hulls is greater than that of a single hull of equivalent size. A single hull could, however, be adopted with certain precautions, particularly in the case of large apparatuses. Figs. 10, 11 and 12 refer to a small apparatus of a total weight of about 500 kilograms. B B B B are short beams located at the extremities of each of hulls C. Each beam carries two rods G provided with hydraulic supporting blades $a$. These rods are not parallel throughout their length, but are partly divergent, as shown in Fig. 11, in order to conveniently support blades of different sizes. The starting blades $a'$, $a^2$, with their rods G' are carried by special beams B' (see Figs. 7, 10 and 12). Safety blades s s are shown fixed to the hulls C C. C' C' C' C' is a rigid cross-piece formed of tubular bars or beams, protected on the part exposed to the pressure of the air, by a covering of lenticular non-symmetrical section. The extremities of the cross-piece by means of springs or elastic cushions V (Figs. 10 and 11) rest on the two hulls C C and thus connect the latter. The cross-piece may be replaced by any suitable form of connection; it has, however, the advantage of giving the necessary strength in all directions, especially when the weight of the apparatus happens to be supported only by two groups of blades situated at the extremities of the same diagonal line, for instance by the front group on the right and the rear group on the left. H is a cabin supported by the cross-piece C' C' C' C' and situated in the center of the apparatus. This cabin, which has a horizontal section of lenticular non-symmetrical form, contains engine F and the transmission, besides providing accommodation for the operator. E E are two aerial propellers mounted on parallel shafts and revolving in opposite directions. The horizontal shafts of the propellers may be driven in any suitable manner by the engine. In the drawing the propeller shafts are shown by means of horizontal transverse shafts m m through bevel gearings (Fig. 11). The transverse shaft is driven by the engine through sprockets and chain. The shaft m m is inclosed in a hollow arm U U having a lenticular non-symmetrical section and which is enlarged at Z Z in the form of egg-shaped housings, covering the bevel gearings. The arm U U and the shafts of the propellers are carried by the cabin, the cross-piece and the hulls C C by means of hollow struts, stays and cross-beams, having lenticular non-symmetrical section as already mentioned, in order to give less resistance to the air. T is the vertical aerial rudder. If the apparatus is also for use on water, it can be provided with a rudder acting in the water. W is an aerial grate connected to the body in the manner hereinbefore described. As shown by dotted lines in Fig. 10, the aerial grate may be kept in a lowered position when the apparatus is floating, and may be raised when it is to become operative. As soon as the air pressure is sufficient the grate automatically assumes a position of equilibrium.

Having thus fully described several improvements to my former invention, what I claim as new and desire to secure by Letters Patent is:

1. In a water conveyance, the combination, with the body, of rods transmitting the supporting thrust thereto, supporting water blades rigidly connected to said rods, and steps on said rods as supports for the blades.

2. In a water conveyance, the combination, with the body, of rods depending therefrom and transmitting the supporting thrust to the body, of supporting water blades rigidly connected to said rods, said blades being strengthened where they are crossed by the rods.

3. In a water conveyance, the combination, with the body, of depending rods transmitting the supporting thrust to the body, and supporting water blades rigidly fixed to said rods, the said rods having notches for holding the blades without piercing them, and projecting portions above the notches as support for the blades.

4. In a water conveyance, the combination with the body, of rods transmitting the supporting thrust to the body and weakened at an intermediate point of their lengths, and supporting blades rigidly secured to said rods.

5. In a water conveyance, the combination, with supporting water blades rigidly connected to rods transmitting the supporting thrust to the body of the apparatus, of notches in said rods creating successive points of fracture.

6. In a water conveyance, the combination, with the body, of depending rods, supporting water blades secured rigidly on said rods, and safety blades normally out of the water and above the supporting blades and intended to come in contact with the water only in case of breakage of the rods.

7. In a water conveyance, the combination with the body, of rods depending therefrom, supporting water blades connected to the rods to transmit the supporting thrust to the body, and a frame protecting the groups of blades and rods from stray floating bodies.

8. The combination, with a body, of rods depending therefrom, supporting water blades secured on said rods, and fenders carried by the rods in advance of the said blades.

9. In a water conveyance, the combination with the body, of supporting water blades secured below the same, and a supporting aerial grate pivotally mounted on the body, and means for varying the distance between the plane of said grate and its pivot.

10. In a water conveyance, the combination, with the body, of depending supporting water blades secured thereto, a supporting aerial grate pivotally connected to the body, and means for varying the distance between the plane of the grate and the pivot thereof, the blades being longitudinally curved in an arc whose height is substantially one-eighteenth of its chord, whereby the vertical reaction of the supporting thrust of the grate will be substantially independent of the speed of the apparatus.

11. The combination, with the body, of an aerial grate pivotally mounted thereon, and means for varying the distance between the plane of the grate and the pivot.

12. The combination, with the body, of a sleeve pivotally mounted thereon, and an aerial grate adjustably secured in said sleeve.

In testimony whereof I have signed my name to this specification in the presence of two subscribing witnesses.

ENRICO FORLANINI.

Witnesses:
ERNEST SANTI,
B. CARLO SALVOLI.